US008738222B2

(12) United States Patent
Conan et al.

(10) Patent No.: US 8,738,222 B2
(45) Date of Patent: May 27, 2014

(54) METHOD FOR CONTROLLING A MULTIMEDIA SYSTEM ON A VEHICLE AND DEVICE FOR IMPLEMENTING SAME

(75) Inventors: Herve Conan, Le Kremlin Bicetre (FR); Remi Rimlinger, Montigny le Bretonneux (FR)

(73) Assignee: Renault S.A.S., Boulogne-billancourt (FR)

( * ) Notice: Subject to any disclaimer, the term of this patent is extended or adjusted under 35 U.S.C. 154(b) by 816 days.

(21) Appl. No.: 12/673,105

(22) PCT Filed: Jul. 30, 2008

(86) PCT No.: PCT/FR2008/051429
§ 371 (c)(1),
(2), (4) Date: Oct. 13, 2010

(87) PCT Pub. No.: WO2009/024711
PCT Pub. Date: Feb. 26, 2009

(65) Prior Publication Data
US 2011/0022264 A1    Jan. 27, 2011

(30) Foreign Application Priority Data
Aug. 10, 2001 (FR) .................................... 07 05825

(51) Int. Cl.
*G06F 17/00* (2006.01)
(52) U.S. Cl.
USPC ......... 701/36; 701/2; 455/91; 455/95; 455/99
(58) Field of Classification Search
None
See application file for complete search history.

(56) References Cited

U.S. PATENT DOCUMENTS

| | | | | |
|---|---|---|---|---|
| 5,656,868 A * | 8/1997 | Gottlieb et al. | ............... | 307/10.6 |
| 5,880,431 A * | 3/1999 | Niimi et al. | ................... | 219/202 |
| 6,052,646 A * | 4/2000 | Kirkhart et al. | ............... | 701/490 |
| 6,055,479 A * | 4/2000 | Kirkhart et al. | ............... | 701/490 |
| 6,059,843 A * | 5/2000 | Kirkhart | ........................ | 701/490 |
| 6,147,418 A * | 11/2000 | Wilson | ......................... | 307/10.6 |
| 6,282,495 B1* | 8/2001 | Kirkhart et al. | ............... | 701/490 |
| 6,330,497 B1* | 12/2001 | Obradovich et al. | ............. | 701/1 |
| 6,374,169 B1* | 4/2002 | Demay et al. | .................... | 701/50 |
| 6,393,573 B1 | 5/2002 | Gillespie et al. | | |
| 6,791,202 B2* | 9/2004 | McCullough | ............... | 290/38 C |
| 7,176,833 B2* | 2/2007 | Jendbro et al. | ............ | 342/357.64 |
| 7,258,092 B2* | 8/2007 | Beaucaire et al. | ..... | 123/142.5 E |
| 7,542,827 B2* | 6/2009 | Gerard et al. | ..................... | 701/2 |

(Continued)

FOREIGN PATENT DOCUMENTS

| | | |
|---|---|---|
| DE | 103 30 451 | 9/2004 |
| EP | 1 069 494 | 1/2001 |
| WO | 02 076794 | 10/2002 |
| WO | 2004 018249 | 3/2004 |

*Primary Examiner* — Jonathan M Dager
(74) *Attorney, Agent, or Firm* — Oblon, Spivak, McClelland, Maier & Neustadt, L.L.P.

(57) ABSTRACT

A method for controlling a multimedia system on an automobile that includes at least one module for executing a multimedia function, having at least one operation state controlled by an action of the user on an interface. The multimedia system includes a prestart state in which at least one prescribed task of the module that does not require any action by the user is initiated, a detection mechanism monitors the occurrence of a vehicle opening or unlocking event, the module is temporarily set in the prestart state following the detection of the event, the module being capable, when in the prestart state, of being switched to the operation state when the user acts on the interface.

13 Claims, 4 Drawing Sheets

(56) References Cited

U.S. PATENT DOCUMENTS

| | | | |
|---|---|---|---|
| 7,650,864 B2* | 1/2010 | Hassan et al. | 123/179.2 |
| 8,096,482 B2* | 1/2012 | Dage | 236/51 |
| 8,209,093 B2* | 6/2012 | Hill | 701/49 |
| 8,294,558 B2* | 10/2012 | Tsuruta et al. | 340/426.13 |
| 8,306,694 B2* | 11/2012 | Mimura | 701/36 |
| 2003/0074590 A1* | 4/2003 | Fogle et al. | 713/320 |
| 2003/0181169 A1* | 9/2003 | Mutoh | 455/99 |
| 2003/0231157 A1* | 12/2003 | Sugino et al. | 345/101 |
| 2003/0231550 A1* | 12/2003 | Macfarlane | 367/198 |
| 2004/0100148 A1* | 5/2004 | Kindo et al. | 307/66 |
| 2005/0023898 A1* | 2/2005 | Eckert et al. | 307/9.1 |
| 2005/0046760 A1* | 3/2005 | Usami | 349/17 |
| 2005/0102069 A1* | 5/2005 | Mueller | 701/1 |
| 2005/0261816 A1* | 11/2005 | DiCroce et al. | 701/36 |
| 2005/0277438 A1* | 12/2005 | Tilk et al. | 455/556.1 |
| 2006/0049922 A1* | 3/2006 | Kolpasky et al. | 340/426.13 |
| 2006/0192650 A1* | 8/2006 | Shinada | 340/5.2 |
| 2006/0212828 A1* | 9/2006 | Yahiro et al. | 715/810 |
| 2006/0220806 A1* | 10/2006 | Nguyen | 340/426.36 |
| 2007/0200672 A1* | 8/2007 | McBride et al. | 340/5.72 |
| 2009/0177677 A1* | 7/2009 | Mikusiak | 707/101 |

* cited by examiner

FIG_2

FIG_3

METHOD FOR CONTROLLING A MULTIMEDIA SYSTEM ON A VEHICLE AND DEVICE FOR IMPLEMENTING SAME

BACKGROUND OF THE INVENTION

The invention relates to a method for controlling a multimedia system on an automobile.

One area of application of the invention is the onboard multimedia systems in automobiles, such as, for example, the GPS-type navigation systems.

The multimedia navigation systems have increasingly sophisticated human-machine interfaces, with software layers that involve starting up the visual and sound system, which is increasingly slow.

The navigation functions are very slow to start up, such as, for example, the display of the map and an itinerary in 10 seconds, the display of traffic information after one minute.

In addition to being an inconvenience for the user, this slowness can be a particular nuisance when the multimedia system includes functions linked to the integrity of the vehicle such as, for example, the display from a rear camera to warn of the proximity of an obstacle.

Given the increasingly large number of functions present on the multimedia system, the waiting time for the user in terms of speed of starting is becoming longer and longer.

SUMMARY OF THE INVENTION

The invention aims to speed up the starting of the onboard multimedia system in an automobile.

To this end, a first subject of the invention is a method for controlling a multimedia system on an automobile comprising at least one module for executing a multimedia function, having at least one operation state controlled by an action of the user on an interface,
characterized in that
the multimedia system includes, in addition to said controlled operation state, a prestart state, wherein at least one prescribed task of the module that does not require any action by the user is initiated, detection means monitor the occurrence of a vehicle opening or unlocking event,
the module is temporarily set to the prestart state following the detection of said event,
the module being capable, when in the prestart state, of switching to said operation state when the user acts on the interface.

According to other characteristics of the invention:
After a prescribed maximum duration of the multimedia system in the prestart state with no action on the interface or without the engine of the vehicle being started, the multimedia system switches to another state in which it is switched off.
The prescribed maximum timer duration in the prestart state has a value less than or equal to thirty minutes, preferably less than five minutes.
In the case of a module comprising a screen, the prestart state includes switching the screen to standby mode,
in the case of a module comprising a local wireless link with a mobile device, the prestart state includes the synchronization of the link,
in the case of a module comprising a voice recognition device, the prestart state includes the loading into a RAM memory of the system, of at least one voice recognition phonemes file from a memory storing this phonemes file,
in the case of a module comprising a road traffic information system, the prestart state includes the recovery of the traffic information stored the last time the module was switched off and dating from less than a predetermined duration,
in the case of a radio station reception tuner module, the prestart state includes the scanning of the received radio stations and the preselection of at least one of these received radio stations,
in the case of a module comprising a vehicle reversing assistance camera, the prestart state includes the switching on of this camera and of a possible module for constructing images from the raw images from the camera (estimated trajectory, etc.),
in the case of a module comprising a vehicle reversing assistance camera, the prestart state includes the switching on of this camera and possibly of the module displaying the image from the camera,
in the case of an audio media playback module, the prestart state includes the detection of the file types contained in the medium and the data associated therewith,
in the case of a module comprising a screen, the prestart state includes the pre-reawakening of the screen,
in the case of a module comprising an audio amplification portion, the prestart state includes the pre-reawakening of the audio amplification portion.
The multimedia system comprising at least one device for presenting information in a form that can be perceived by the user, there is provided an operation state of the module that includes the sending of information from this module to said device so that it can be presented to the user, the prestart state including at least one task for activating the module with deactivation of the information presentation device so that it does not present information coming from the module.
The prestart state includes the independent initialization of the module.
The prestart state includes the automatic reception of external data by a wireless receiver of the system so that said data can be used by the module.
The prestart state includes the automatic loading, from a mass memory in which it is stored, of at least one application to a RAM memory.
The multimedia system comprising at least one device for presenting information in a form that can be perceived by the user, at least one module includes a first operation state corresponding to a state of non-use, in which the module does not send information to the information presentation device so it can be presented, and a second operation state, wherein the module sends information to said device so that it can be presented,
there is provided at least one interface respectively associated with each module to switch said module to the second operation state, and another interface for controlling the starting and stopping of the engine of the vehicle,
the state of use or non-use that the module had when the engine of the vehicle was last stopped is stored in a memory,
the module switches from the prestart state to the first operation state when the other control interface is actuated to start the engine with a state of non-use stored as the last state in the memory,
the module switches from the prestart state to the second operation state when its associated interface is actuated or when the other control interface is actuated to start the engine with a state of use stored as the last state in the memory, the module being capable of switching between one and the other of the first and second operation states when its associated interface is actuated.

A second subject of the invention is a device for controlling a multimedia system on an automobile to implement the control method as described above, the multimedia system comprising at least one module for executing a multimedia function, having at least one operation state controlled by an action of the user on an interface,
characterized in that it comprises means of detecting a vehicle opening or unlocking event,
a unit for controlling the multimedia system, linked to the detection means and including means of controlling the module to temporarily switch it to the prestart state when the detection means have detected an opening or unlocking event, and means of controlling the execution by the module of at least one prescribed task that does not require any action by the user is initiated,
means being provided to switch the module from the prestart state to the operation state by action on the interface.

BRIEF DESCRIPTION OF THE DRAWINGS

The invention will be better understood from reading the following description, given purely by way of nonlimiting example, with reference to the appended drawings in which.

DETAILED DESCRIPTION OF THE INVENTION

Figure 1:
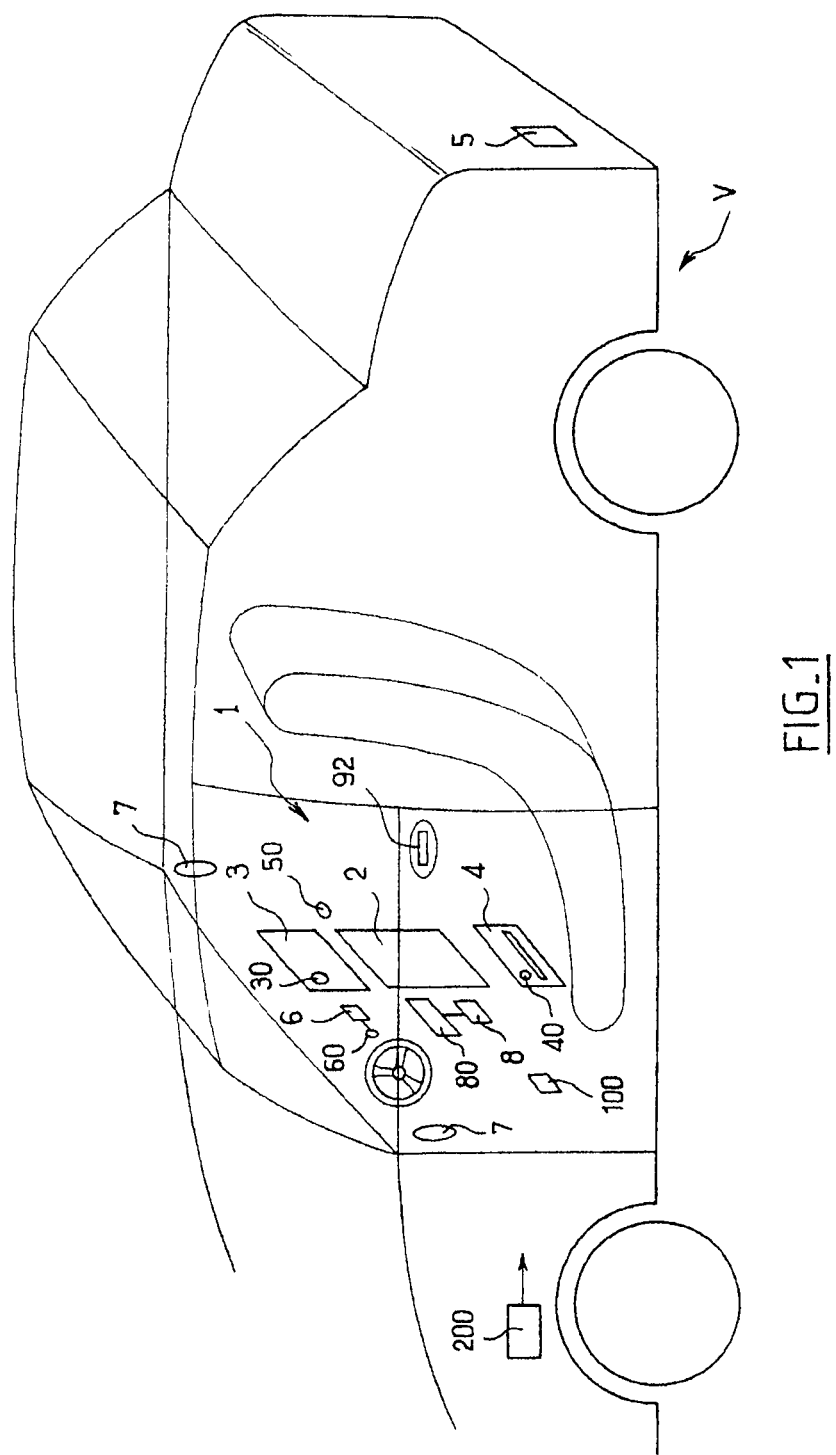
FIG. 1 is a diagram showing various elements of a multimedia system, wherein the inventive control method is implemented.

In FIG. 1, the automobile V includes a multimedia system 1, comprising, for example, the following modules on the dashboard (the dashboard including the instrument panel with speed indication):
  a screen 2 for displaying images on the dashboard, for example for displaying a road map and an itinerary from a GPS-type navigation system 8,
  a tuner module 3 for listening to the radio, including an interface 30 for switching the latter on and off,
  a drive 4 for playing removable audio media such as, for example, CDs and/or cassettes, including an interface 40 for switching it on and off,
  a camera 5 positioned at the rear of the vehicle V to assist in reversing the vehicle, also called parking camera, associated on the dashboard with an interface 50 so that the display on the screen 2 of the image taken by the camera 5 can be switched off,
  a module 6 including a base for receiving a cell phone having a local wireless link (of the Bluetooth (registered trademark) type for example), this module having, for example, an interface 60 for switching it on and off,
  one or more loudspeakers 7 in the passenger compartment,
  the GPS-type navigation system 8, possibly provided with an interface 80 for switching it on and off,
  a head-up vision system, not shown.
The interfaces for switching on and off are, for example, shared by just one for everything audio (radio, CD, AUX, etc.). Consequently, the interfaces 30, 40, 50, 60, 80 can be actuated by the user to control the operation of their associated module 3, 4, 5, 6, 8. They can be manual, comprising, for example, knobs, buttons or levers, but can also be implemented by voice commands. The loudspeaker or loudspeakers 7 and the screen 2 form a device for presenting information to the user, capable of broadcasting the information sent by the modules 3, 4, 5, 6, 8 when they are being used.

Currently, some suppliers offer staged startups, such as, for example, sound in less than 2 seconds, the startup film in under 4 seconds, the map in under 8 seconds, the traffic information and itinerary calculation in under 10 seconds.

However, this solution is not optimal, because it still takes too long. In the current multimedia systems, the starting up of the system must be done fully to render the functions of the system operational. The diagram of FIG. 2 shows the necessary transitions for activating and switching off the system according to a known solution.

Figure 2:
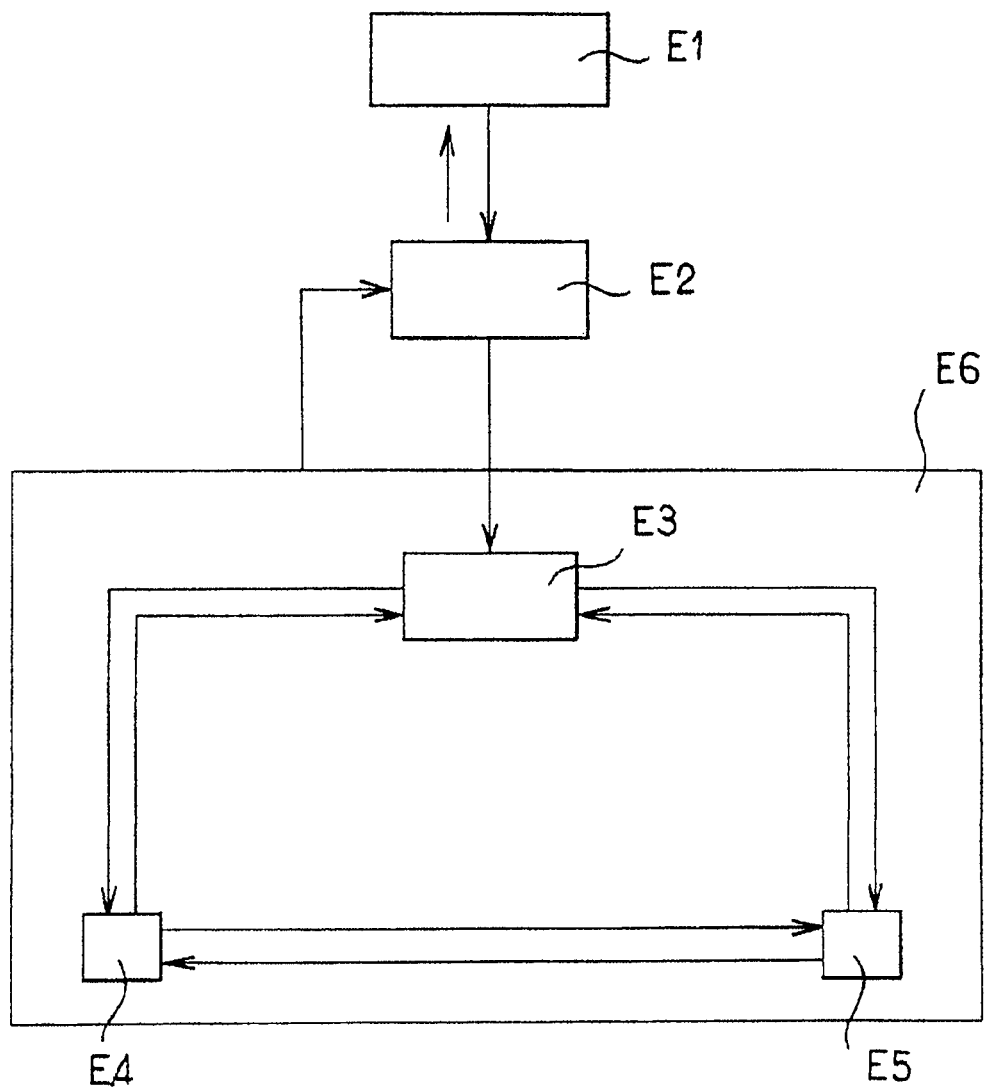
FIG. 2 is a state diagram of a multimedia system according to one existing solution.

In FIG. 2, the multimedia system 1 comprises the following different operation states:
  a state E1 of absence of energy power supply by the vehicle's battery 200,
  a stopped state E2 but with energy power supply from the battery 200 of the vehicle V,
  a waiting state E3,
  a first operation state E4 controlled indirectly by an action of the user on a general control interface 100, corresponding to a state of non-use of a module,
  a second controlled operation state E5, corresponding to a state of use of a module.
The system 1 switches from the state E1 to the state E2 when the battery of the vehicle is connected to the latter to supply it with electricity.

The system for starting the vehicle V, diagrammatically represented by the reference 100 in FIG. 1, also forms an interface via which the user can act on the vehicle to start its engine. This interface 100 is, for example, conventionally formed by a start and stop button (START/STOP) or by the turning of a key in a starter system, or by any other system.

In the waiting state E3, a control unit 110 of the system 1 monitors to see if the user actuates the interface 100 for starting the vehicle or one of the interfaces 30, 40, 50, 60, 80 associated with the module 3, 4, 5, 6, 8, these interfaces being linked to the unit 110.

When the user actuates one of the interfaces 30, 40, 50, 60, 80 respectively associated with the module 3, 4, 5, 6, 8, the module switches from the waiting state E3 to the operation state E5.

The system 1 includes a memory 90 linked to the unit 110 and storing the state of use or non-use in force on the module when the engine of the vehicle was stopped via the interface 100. The state of use corresponds to the display of an image on the screen 2 and/or the emission of a sound on the loudspeaker or loudspeakers 7 from the module 3, 4, 5, 6, 8. On the other hand, the state of non-use corresponds to the fact that the module that was previously in the state of use was switched off by the user by action on its associated interface, and is no longer sending information to the screen 2 or to the loudspeakers 7.

The module switches from the state E3 to the state E4 when both the last state stored in the memory 90 of the system 1 is a state of non-use of the module and when the general control interface 100 of the vehicle has been actuated.

The module switches from the state E3 to the state E5 also when the user has actuated the interface 100 and when the last state stored in the memory 90 was a state of use of the module.

In the state E4 or E5, when the interface 30, 40, 50, 60, 80 associated with the module 3, 4, 5, 6, 8 is actuated, the module switches to the state E5 or E4.

Thus the states E3, E4, and E5 correspond to a general switch-on state E6 of the system 1. From this state E6, the system 1 can return to the state E2 by any appropriate means.

Figure 3:
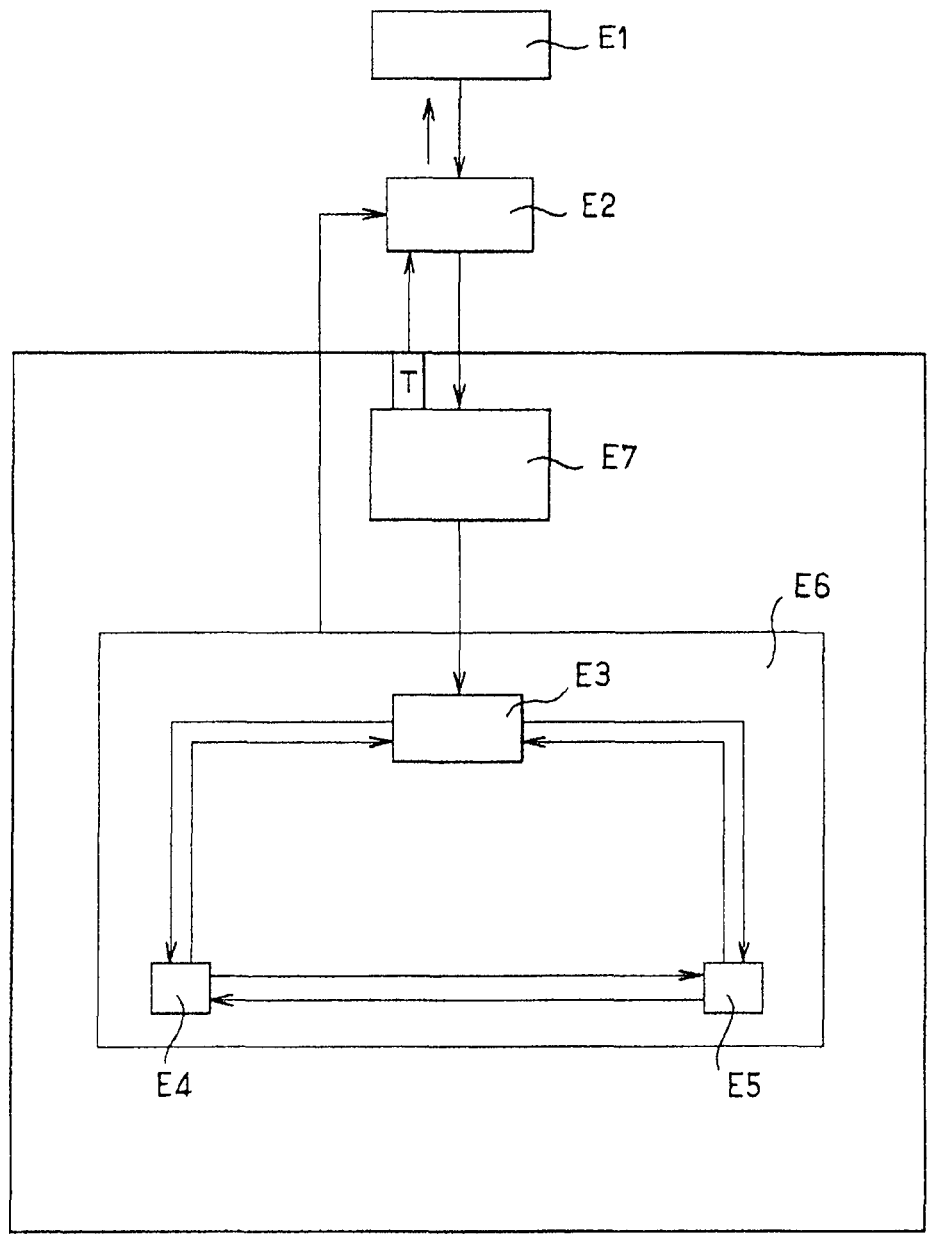
FIG. 3 is a state diagram of the method for controlling a multimedia system according to one embodiment of the invention.

According to the invention, in FIG. 3, a prestart state E7 of the multimedia system 1 is provided, through which the module must pass to switch from the state E2 to the state E6, that is, E3, E4 or E5.

Figure 4:
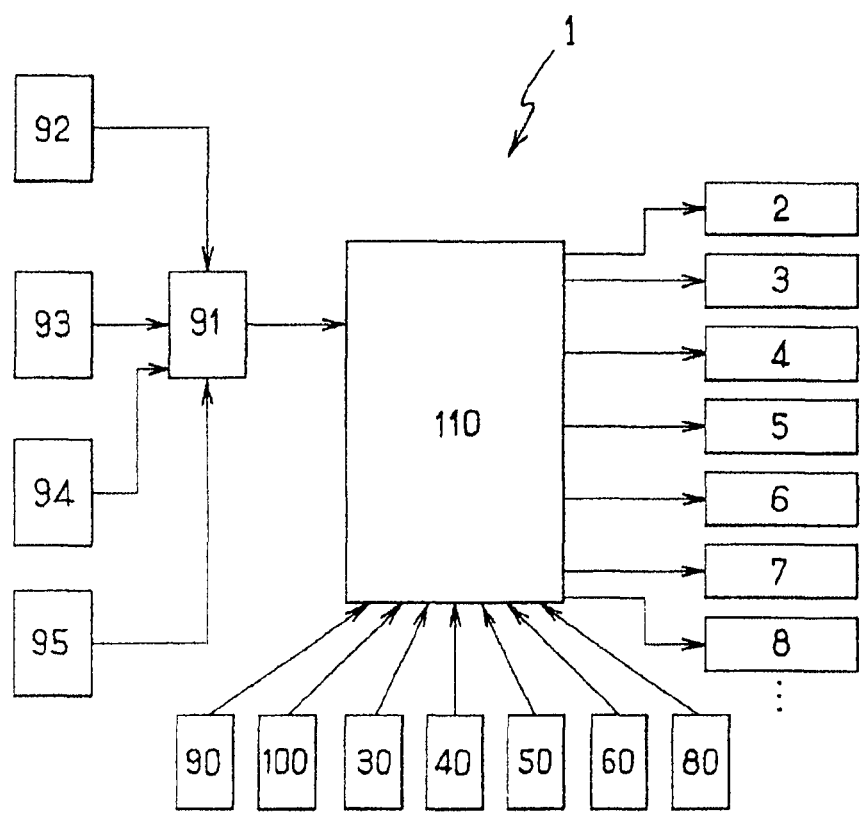
FIG. 4 is a modular block diagram of a control device for implementing the inventive method.

A system 91 for detecting the opening or unlocking of the vehicle is provided on the latter. The unlocking of the vehicle can correspond to its unlocking, for example remotely using a transponder 93 or similar to enable the user to open the doors by their handle 92. The unlocking can also correspond to a mechanical action on one of the doors by turning a key 95 in the latter, this unlocking then making it possible for any one of the doors to be opened by operating its handle 92. The opening of the vehicle corresponds to an opening of a door by operating its handle 92 if the vehicle is not locked. The unlocking can also take place through a hands-free card system, symbolized by the reference 94 in FIG. 4, provided on one or more of the handles 92 of the doors and trunk, by which the door or doors of the vehicle are unlocked by placing the hand around the handle 92. This system 91 constitutes, for example, a system for detecting an action of at least partly opening at least one door lock of the vehicle, a partial opening corresponding to an unlocking or releasing, a total opening corresponding to the opening of a door.

In the prestart state E7, the unit 110 controls the execution of prescribed tasks by the modules.

This intermediate prestart state E7 is automatically activated by the control unit 110 when the detection system 91 indicates that a door of the vehicle has been opened or that the vehicle has been unlocked.

The prestart state E7 is associated with a timer device according to a prescribed maximum duration T during which the multimedia system 1 can be in this state E7 following the detection of the vehicle opening or unlocking event.

If, after this prescribed maximum duration T in the prestart state E7, no interface 30, 40, 50, 60, 80 of the modules 3, 4, 5, 6, 8 has been actuated by the user and if the interface 100 for starting the engine of the vehicle has not been actuated by the user, the multimedia system 1 returns to the state E2.

When the system 1 is in the prestart state E7 and the interface 100 or one of the interfaces 30, 40, 50, 60, 80 respectively associated with the modules 3, 4, 5, 6, 8 is actuated by the user, the system 1 and the associated modules switch from this prestart state E7 to the operation state E6, that is to say E3, E4 or E5 depending on the case, as described hereinabove. Consequently, the system 1 can switch from the stop state E2 to the controlled operation state E4 or E5 only via the prestart state E7.

This prescribed maximum timer duration T in the prestart state E7 is, for example, a few minutes, notably approximately 2 minutes. One case of use of this timer to switch from the state E7 to the state E2 may be that of the user who opens then closes his vehicle again without having started the engine, or that of the user who opens his vehicle and gets in without starting the multimedia system, or the vehicle.

The multimedia system 1 exploits the prestart state E7 to execute, under the control of the unit 110, certain tasks such as, for example, opening certain applications. In the prestart state E7, the sound coming from the multimedia system 1 is not audible on the loudspeakers 7 and the screen 2 is switched off, in order to minimize the electrical energy consumption. For a multimedia system 1 equipped with a mass memory such as, for example, a hard disk, this mass memory is, for example, switched on in the state E7.

In one embodiment, the memory, the processor, the reading and writing of the configuration to be displayed on the screen 2 or to have listened to on the loudspeakers 7 are activated during the prestart state E7. During this prestart state E7, tasks can also be performed to speed up the reception of data external to the system, for example on the radio tuner 3, the tuner of the GPS-type navigation system 8, the reversing camera 5.

Cases of use of the prestart state are described hereinbelow.

In a first case, the user is in communication using his cell phone, enters his vehicle then presses on the interface 60. Since his telephone has already been synchronized with the module 6 by pairing during the prestart state E7, the sound from the telephone is almost immediately received in the loudspeakers 7 of the vehicle and the call is displayed as being in progress on the screen 2 after pressing on the interface 60, with no call cut-off, which allows the user to place his telephone on the base supporting the module 6 when such a base is provided.

In a second case, the vehicle is parked in a place that has an obstacle at the rear, for example a post or another vehicle very close to the rear. When the system is in the prestart state E7 on stopping the vehicle, the welcoming film usually run on the screen 2 and the loudspeakers 7 on starting up the system may be cut off at any time to display the view taken by the rear camera 5, in order, for example, to give a better understanding of the audible warnings that might have been emitted to warn of the presence of a rear obstacle.

In a third case, if the system has a mode for rapidly recovering traffic information, in under 10 seconds for example via a high bit rate digital channel, for example of DAB+, SDARS, DRM, telematics type, the calculation of the itinerary to the previous destination or to a destination in the address book will be done systematically by taking into account the traffic information by calculating a new itinerary. The position of the vehicle is recalculated by the navigation module 8 in the prestart state E7.

For example, for electrical energy consumption problems, the prestart state E7 has a time delay less than or equal to 5 minutes.

The tasks executed in the prestart state E7 comprise, for example, one or more of the following:

In the case of a multimedia system 1 equipped with a voice recognition device and a microphone to be able to address voice commands to the system, the phonemes files necessary for the voice recognition are loaded from a mass memory into a RAM memory.

In the case where the module 6 is used to receive a cell phone that has a local wireless link (for example of the Bluetooth (registered trademark) type), this link between the telephone and the module 6 is synchronized, in the case where the telephone has previously been declared and switched on.

In the case of the module 8 including a road traffic information system, the traffic information having been stored the last time it was switched off and which, according to the time-stamping information, dates from less than a predetermined duration, for example of the order of a few minutes, notably approximately 15 minutes, are recovered by the module 8, to be able, when it is switched to one of the states E4 or E5, or globally E6, to be rapidly displayed on the screen 2 or announced over the loudspeakers 7. These tasks can be very useful in the case of short stops of the vehicle, for example at a refueling station.

In the case of the radio tuner module 3, the radio stations available for reception are scanned, for example, to preselect the stations that have already been stored by the user. This scanning and this preselection can be performed, for example, on the radio stations that broadcast a certain technical type of information such as information of the RDS-TMC type for the broadcasting of traffic information, in order to begin receiving this traffic information, the rate of transfer of the TMC-type information possibly being slow at approximately one event per second. The radio channel for the stations may also be sophisticated, being, for example, of DAB+, DRM, SDARS, DMB, or similar type.

In the case of the proximity camera or cameras 5, said cameras are woken up, as is the possible associated display module.

In the case of the loudspeaker audio system 7, the audio parameters are loaded.

In the case of playback of audio media such as, for example, CDs (MP3, WMA, etc.), the playback is controlled to detect the content file types and the associated data, and allow immediate sound output upon the switch to E6.

Pre-reawakening of the screen, notably for the case where the latter includes display management modules.

Pre-reawakening of the audio amplification portion.

When the system leaves the prestart state E7 to switch to the operating state E4 or E5, globally E6, the tasks that have already been performed during the prestart state E7 will make it possible to save time between the moment when the user actuates one of the interfaces and the moment when the actuated module or modules are in the operation state for the user, that is to say, in the embodiment hereinabove, until the moment when the screen will be reawakened, together with the audio amplification portion, so as to be able to display the image imposed by the module or modules having been actuated and broadcast the sound imposed by the module or modules having been actuated. The user will then have the impression of an almost immediate visual and audible startup.

The invention claimed is:

1. A method for controlling a multimedia system on an automobile including at least one module for executing a multimedia function, having at least one operation state controlled by an action of a user on an interface in the automobile and a prestart state, the method comprising:
    initiating at least one prescribed task of the module that does not require any action by the user;
    monitoring, by a detection unit, occurrence of a vehicle opening or unlocking event;
    temporarily setting the module to the prestart state following the detection of the opening or unlocking event, the prestart state including synchronizing a link with a mobile device; and
    switching from the prestart state, to the operation state when the user acts on the interface, the operation state including automatically providing information relating to the mobile device on the interface.

2. The control method as claimed in claim 1, wherein, after a prescribed maximum duration of the multimedia system in the prestart state with no action on the interface or without an engine of the vehicle being started, the multimedia system switches to another state in which it is switched off.

3. The control method as claimed in claim 2, wherein the prescribed maximum duration in the prestart state has a value less than or equal to thirty minutes, or less than five minutes.

4. The method as claimed in claim 1, wherein when the automobile includes
    a module comprising a screen, the prestart state includes switching the screen to a standby mode,
    a module comprising a voice recognition device, the prestart state includes loading into a RAM memory of the system at least one voice recognition phonemes file from a memory storing the phonemes file,
    a module comprising a road traffic information system, the prestart state includes recovery of traffic information stored a last time the module was switched off and dating from less than a predetermined duration,
    a radio station reception tuner module, the prestart state includes scanning of received radio stations and preselection of at least one of the received radio stations,
    a module comprising a vehicle reversing assistance camera, the prestart state includes switching on of the camera and/or of the module displaying an image from the camera,
    an audio media playback module, the prestart state includes detection of file types contained in the medium and data associated therewith,
    a module comprising a screen, the prestart state includes pre-reawakening of the screen,
    a module comprising an audio amplification portion, the prestart state includes pre-reawakening of the audio amplification portion.

5. The control method as claimed in claim 1, wherein the multimedia system includes at least one device for presenting information in a form that is perceived by the user, wherein there is provided an operation state of the module that includes the sending of information from the module to the device so that the information is presented to the user, the prestart state including at least one task for activating the module with deactivation of the information presentation device so that it does not present information coming from the module.

6. The control method as claimed in claim 1, wherein the prestart state includes independent initialization of the module.

7. The control method as claimed in claim 1, wherein the prestart state includes automatic reception of external data by a wireless receiver of the system so that the data is used by the module.

8. The control method as claimed in claim 1, wherein the prestart state includes automatic loading, from a mass memory in which it is stored, of at least one application to a RAM memory.

9. The control method as claimed in claim 1, wherein the multimedia system includes at least one device for presenting information in a form that is perceived by the user, wherein at least one module includes a first operation state corresponding to a state of non-use, in which the module does not send information to the information presentation device so it is presented, and a second operation state, wherein the module sends information to the device so that the information is presented,
    there is provided at least one interface respectively associated with each module to switch the module to the second operation state, and another interface for controlling starting and stopping of an engine of the vehicle,
    the state of use or non-use that the module had when the engine of the vehicle was last stopped is stored in a memory,
    the module switches from the prestart state to the first operation state when an other control interface is actuated to start the engine with a state of non-use stored as the last state in the memory, the module switches from the prestart state to the second operation state when its associated interface is actuated or when the other control interface is actuated to start the engine with a state of use stored as the last state in the memory, the module configured to switch between one and the other of the first and second operation states when its associated interface is actuated.

10. A device for controlling a multimedia system on an automobile to implement the control method as claimed in claim 1, the multimedia system including at least one module for executing a multimedia function, having at least one operation state controlled by an action of the user on an interface, comprising:

the detection unit detecting a vehicle opening or unlocking event;

a unit controlling the multimedia system, linked to the detection unit and configured to control the at least one module to temporarily switch it to the prestart state when the detection unit detects an opening or unlocking event, and is configured to control execution by the at least one module of at least one prescribed task that does not require any action by the user is initiated, wherein the prestart state includes synchronizing a link with a mobile device; and a switching unit configured to switch the module from the prestart state to the operation state by action on the interface, the operation state including automatically providing information relating to the mobile device on the interface.

11. The control method as claimed in claim 1, wherein, after a prescribed maximum duration of the multimedia system in the prestart state with no action on the interface, the multimedia system switches to another state in which it is switched off.

12. The control method as claimed in claim 1, wherein when the automobile includes a module comprising a voice recognition device, the prestart state includes loading into a RAM memory of the system at least one voice recognition phonemes file from a memory storing the phonemes file.

13. The control method as claimed in claim 1, wherein when the automobile includes a module comprising a vehicle reversing assistance camera, the prestart state includes switching on of the camera and/or of the module displaying an image from the camera.

* * * * *

UNITED STATES PATENT AND TRADEMARK OFFICE
CERTIFICATE OF CORRECTION

PATENT NO.         : 8,738,222 B2                                                                 Page 1 of 1
APPLICATION NO.    : 12/673105
DATED              : May 27, 2014
INVENTOR(S)        : Herve Conan et al.

It is certified that error appears in the above-identified patent and that said Letters Patent is hereby corrected as shown below:

On the title page, Item (30), The Foreign Application Priority Data should read:

-- (30)              Foreign Application Priority Data

Aug. 10, 2007         (FR) .................................. 07 05825 --

Signed and Sealed this
Ninth Day of September, 2014

Michelle K. Lee
*Deputy Director of the United States Patent and Trademark Office*